United States Patent [19]

Stoudt

[11] Patent Number: 4,469,302

[45] Date of Patent: Sep. 4, 1984

[54] FLAG STAFF HOLDER FOR WINDPROOF SIGNS

[75] Inventor: Theodore L. Stoudt, Lake Oswego, Oreg.

[73] Assignee: Sign-up Corporation, Portland, Oreg.

[21] Appl. No.: 239,215

[22] Filed: Jul. 17, 1981

[51] Int. Cl.³ .............................................. F16M 13/00
[52] U.S. Cl. .................................... 248/512; 248/535; 403/361
[58] Field of Search ............... 248/512, 519, 534, 535, 248/DIG. 12, 511, 516, 523, 526, 314, 111, DIG. 11, 309 R, 524, 110; 47/41.12, 41.13; 211/66, 65, 89; 43/289, 362, 249; D26/9; 403/361, 365, 372

[56] References Cited

U.S. PATENT DOCUMENTS

| 2,151,192 | 3/1939 | Crosser | 248/512 |
| 2,978,780 | 4/1961 | Clarkson | 248/519 |
| 3,242,526 | 3/1966 | Wilson et al. | 431/289 X |
| 3,371,896 | 3/1968 | Cox | 248/526 |
| 3,664,617 | 5/1972 | Fenwick | 248/534 |
| 3,815,853 | 6/1974 | Bahner | 248/524 |
| 4,026,508 | 5/1977 | Ziegler | 248/DIG. 12 |
| 4,360,288 | 11/1982 | Rutledge | 403/361 |

FOREIGN PATENT DOCUMENTS 106550 1/1899 Fed. Rep. of Germany ...... 431/289

*Primary Examiner*—Ramon S. Britts
*Assistant Examiner*—Ramon O. Ramirez
*Attorney, Agent, or Firm*—Hubbard & Stetina

[57] ABSTRACT

A flag staff holder for sign supports adapted to hold different size shafts comprising a conical socket with protuberences inwardly at levels therein is disclosed.

1 Claim, 4 Drawing Figures

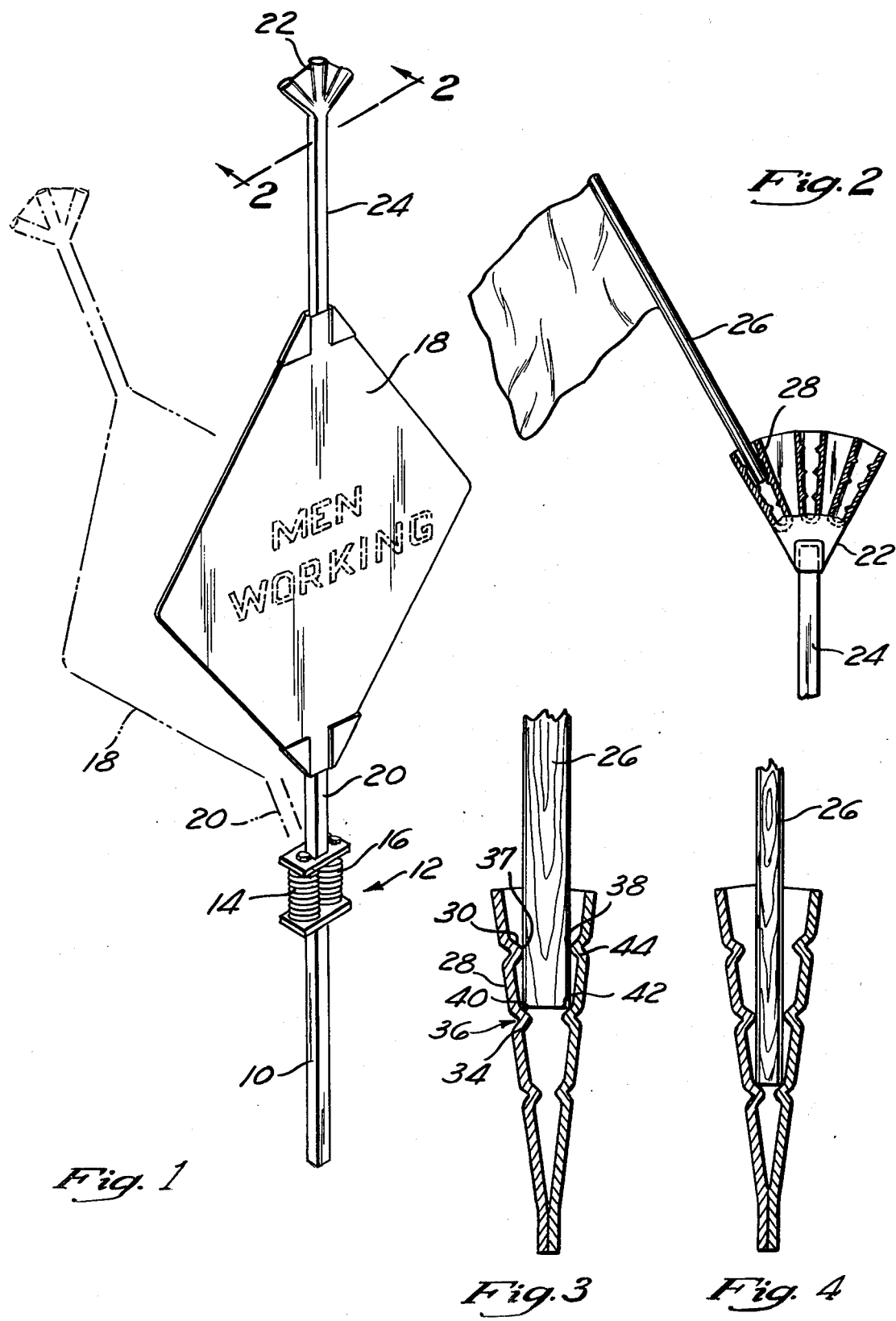

FLAG STAFF HOLDER FOR WINDPROOF SIGNS

CROSS-REFERENCE TO RELATED APPLICATION

The subject matter of the invention disclosed herein is related to co-pending U.S. patent application Ser. No. 120,677, now abandoned entitled Sign Standard For Supporting and Displaying a Sign which is a continuation in part of U.S. application Ser. No. 950,466, now abandoned and bearing the same title.

TECHNICAL FIELD

This invention relates to standards for supporting signs in commercial establishments, and to warn of highway construction and damage. More particularly, this invention relates to signs in which specific means are provided for receiving and securely holding various sized flag poles for attracting attention.

BACKGROUND OF THE INVENTION

Very often it is desirable to fly one or several brightly colored flags from the top of signs to attract attention to them. However, where the sign is of the flexible variety, it tilts when the force of the wind on the sign or any other force acts on it. The very tilting action which renders the sign useful also creates a problem in keeping the flags attached to the top of the sign. Some conventional flag staff holders are cylindrically shaped and the flag staff sits in the cylinder by the force of gravity. If the cylinder were to be tipped at an angle to vertical, for example in a strong wind, the wind force on the flag could pull the flag staff out of the holder. A set screw through the side of the cylindrical holder could be used, but such a structure is more expensive to manufacture than is necessary to do the job. Further, cylindrical holders can only be used for flag staffs which have a diameter less than the inside diameter of the holder.

It is advantageous to have a flag staff holder which can be used with flags having a wide range of flag staff sizes. Conical shaped staff holders can be used for such a purpose, but, because they contact the flag staff only at the location in the cone where the flag staff diameter equals the inside diameter of the cone, the grip of the holder on the flag staff is not very strong. This weakness of grip arises from the fact that the flag staff is contacted in only one place and the area of contact is relatively small. Thus the need arose for a flag staff holder that could be used on a windproof tilting sign for a wide variety of sizes of flag staffs but which securely held the flag staff even while the sign was tilted because of high winds or other forces acting on the sign.

SUMMARY OF THE INVENTION

The present invention comprises a conically shaped flag staff holder having projections on the inside surface arranged in concentric circles spaced throughout the length of the cone such that the inside diameter of the cone is reduced at the location of the circles of projections. By virtue of these concentric circles of projections, a flag staff can be jammed down in the conical flag staff holder such that several areas of contact are achieved with the flag staff thereby creating a universal flag staff holder with strong staff gripping properties.

BRIEF DESCRIPTION OF THE DRAWINGS

FIG. 1 is an overall view of a windproof sign showing the relative location of the flag staff holder on the structure;

FIG. 2 is a view of the flag staff holder portion of the flexible sign taken along view line 2—2 in FIG. 1;

FIG. 3 is a closeup view of the inventive structure with a larger size staff inserted;

FIG. 4 is a closeup view of the inventive structure with a smaller size staff inserted.

DETAILED DESCRIPTION OF THE PREFERRED EMBODIMENT

FIG. 1 shows a view in perspective of a windproof sign. Support 10 is coupled to resilient means 12 to support the resilient means from a base or other structure. The resilient means 12 can be comprised of springs 14 and 16 or any other resilient structure. A sign 18 is supported by shaft 20 which is coupled to resilient means 12 such that when the wind exerts great pressure on sign 18, it can tilt to the position shown in phantom.

The flag staff holders 22 of the present invention are supported from sign 18 by supporting member 24. The purpose of these flag staff holders 22 is to securely hold the staffs of flags flown from the top of the sign even when the wind or other forces tilt the sign such that the flag staffs do not come out of the holders 22.

FIG. 2 shows the manner in which wooden flag staffs 26 are held in flag staff holder 22. FIGS. 3 and 4 show how a large size and small size flag staff are held in conical flag staff holder 28 shown in cross section. Projection 30 is one of a plurality of such projections arranged in a concentric circle around the level of conical holder 28 indicated generally at 32. Another projection 34 is one of a plurality of such projections arranged in a concentric circle around the periphery of conical holder 28 at the level generally indicated at 36. As shown in FIG. 3, the conical holder 28 makes contact with flag staff 26 at four points of contact 37, 38, 40 and 42 as opposed to two contact points 40 and 42 if projections 30 and 44 were not present. These added points of contact give added mechanical stability to the connection. Of course, the diameter of staff 26 may be such that only three points of contact are made, but if projections are formed in concentric circles at many more levels than shown in FIG. 3, then it is possible to establish many more points of contact with the flag staff 26 than the four shown in FIG. 3 and FIG. 4. The number of contact points is proportional to the number of levels of cone 28 which have projections formed in them.

The cone-shaped flag staff holders 28 can be formed in any known manner and utilizing any material which has sufficient strength. In the preferred embodiment, the cones are made of thin metal and the projections are stamped into the metal. In other embodiments the projections could be formed in other manners such as by welding or riveting ribs to the walls of the cones. These projections or ribs could also be sharply pointed or blunt and knurled. The projections could also be covered with a non-skid type covering or a tacky or rubber coating.

What is claimed is:

1. An apparatus for securely holding a flag staff comprising:
    a plurality of hollow, cone-shaped housings formed of thin metal each having a cone-shaped interior;

a staff extending in a direction opposite to the open end of the cone-shaped interior; and a plurality of concentric rings of different diameters stamped in said metal so that they protrude from the interior wall of said housing toward the center of the cone, at least two of said rings positioned to contact said staff, said first ring contacting said staff on the end of said staff, and said second ring contacting said staff at a point axially spaced from said end of said staff, adapted to retain said staff and prevent said staff removal out of said housing due to laterally applied forces, while permitting removal due to vertical forces applied to said staff.

* * * * *